United States Patent Office 3,523,720
Patented Aug. 11, 1970

3,523,720
FRESNEL FIELD LENS FOR REFLEX CAMERAS
Karl Schiele, Gifhorn, Germany, assignor to Rollei-Werke Franke & Heidecke, Braunschweig, Germany, a firm of Germany
Filed July 9, 1968, Ser. No. 743,422
Int. Cl. G02b, 3/08
U.S. Cl. 350—211                    4 Claims

ABSTRACT OF THE DISCLOSURE

A Fresnel field lens for the finder of a reflex camera has each annular step of the lens formed with a wavy or undulating shape in a circumferential direction to provide, on each step, a range of focal lengths so as to give a sharp and brilliant finder image notwithstanding use of this field lens with finder lenses of different focal lengths and notwithstanding differences in the distance from the eye of the observer to the field lens. In addition to the circumferential undulations in each step of the Fresnel lens, one embodiment of the invention also divides each step into two concentric annular zones.

BACKGROUND OF THE INVENTION

In the finder of a reflex camera, the basic problem is to obtain the brightest possible image on the focusing screen. To help in obtaining a good image, it has been proposed to use a field lens (sometimes called a collecting lens) in conjunction with the focusing screen, examples of this being U.S. Pats. 2,589,014 and 3,003,387.

For maximum brightness of the image on the focusing screen (which screen may at times be formed on one face of the field lens, but not necessarily so) it is desirable that the beam of light passing through the pupil of the finder lens of the camera (which is the same as the photographing lens in the case of a single lens reflex camera, or is a separate lens, in the case of a twin lens reflex camera) is brought by the converging action of the field lens fully into the entrance pupil of the eye of the observer. This can be readily accomplished if the field lens is always used with a finder lens of the same focal length and if the eye of the observer is always at the same distance from the focusing screen. But if the focal length of the finder lens is changed (as for example when using another interchangeable lens on the camera, or when readjusting a zoom lens on the camera) a field lens of the conventional kind will not give maximum brilliance except when used with a finder lens of the particular focal length for which the field lens is designed; and there is also loss of brilliance if the eye of the observer is placed closer to or farther away from the focusing screen than the particular distance for which the field lens is designed. In order to overcome the loss of brilliance resulting from changes in the focal length of the finder lens or changes in the distance from the eye of the observer, it has been suggested to use, instead of a conventional Fresnel lens, a field lens different portions of which have different focal lengths. Examples of this are the lenses shown in German Pats. 753,376 and 1,047,470, and in German auslegeschrift 1,171,728. However, the solutions suggested in the German references just cited are not entirely satisfactory. The lenses suggested therein are, in some cases, difficult to make, and in other cases are open to various other objections, including an objectionable appearance of rings in the finder image.

An object of the present invention is the provision of a generally improved and more satisfactory field lens of the Fresnel type, for the finders of reflex cameras.

Another object is the provision of an improved field lens for reflex cameras, so designed as to give a finder image of improved brilliance, through a range of different focal lengths of the finder lens, and through a range of distances of the eye of the observer from the focusing screen, rather than just a single focal length of finder lens or a single distance of the eye of the observer.

Still another object is the provision of a field lens designed to do this without undesirable distortion and without producing the appearance of distracting or disturbing rings in the finder image.

A further object is to provide an improved method for manufacturing the lens in an easy and economical manner,

BRIEF DESCRIPTION OF THE DRAWINGS

In the accompanying drawings incorporated herein by reference, and constituting a material part of the disclosure and showing illustrative embodiments of the invention.

DESCRIPTION OF THE PREFERRED EMBODIMENTS

Figure 1:
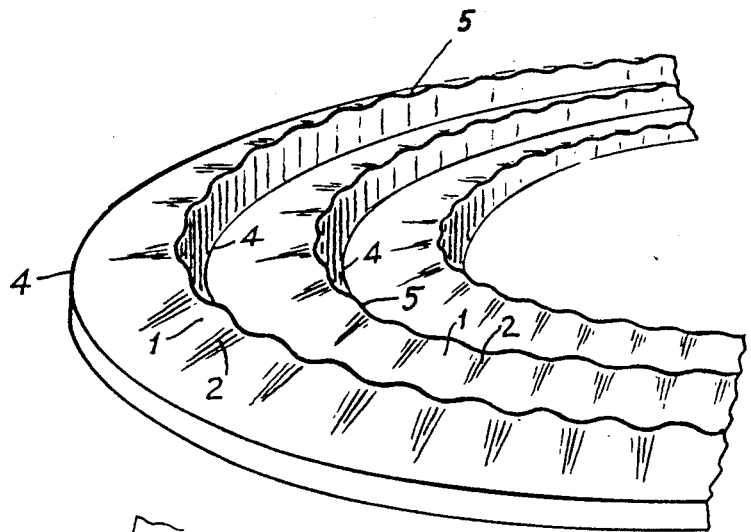
FIG. 1 is a schematic perspective view of a fragment of a field lens in accordance with the present invention, illustrating the general arrangement of a simple form of the invention.

Referring first to FIG. 1, there is shown in schematic perspective the general shape of a fragment of the lens of the present invention, the undulations as well as the width of the various steps being greatly exaggerated. Also, in this view, only three separate steps are shown, whereas in practice the actual number of concentric steps would be much greater. The width (in a radial direction) of each step can be varied within the skill of the art, as will be apparent to those familiar with Fresnel lenses as used at the focusing screen of a camera. Usually each step will have a width, in a radial direction, of the order of magnitude of about 50 microns.

In a conventional Fresnel lens, each step is smooth in a circumferential direction, and all parts of each individual step have the same radial profile. The result of this, of course, is that the complete lens has only a single focal length, which is chosen so as to give maximum brilliance to the finder image when the eye of the observer is at a particular assumed distance from the viewing screen and when the image is projected onto the viewing screen by a finder lens of a particular focal length. (As already mentioned, the finder lens is also the photographing lens, in a single lens reflex camera, but is a separate lens, usually of the same focal length as the picture taking or photographic lens, in a twin lens reflex camera.) But if the eye of the observer is moved to a different distance from the focusing screen, as for example when viewing the focusing screen through a magnifying lens rather than directly by the unaided eye, then maximum brilliance of the image is no longer achieved. The same is true if the focal length of the lens which projects the image onto the focusing screen is changed, by readjusting a zoom lens or by substituting a different interchangeable lens.

In the lens of the present invention, however, each step is not smooth in a circumferential direction, but is wavy or undulating in such direction, so that each step has a radial profile which, in one radial plane, differs slightly from the radial profile in another radial plane close to but slightly separated in a circumferential direction from the first radial plane. Preferably the outer edge of each step (that is, the edge farthest from the center of the lens and adjacent to the vertical surface which separates this step from the next step radially outwardly) is smooth in a circumferential direction, while the inner edge of the step has the maximum amount of waviness or undulation, and intermediate points in the width of the step have proportionate amounts of waviness or undulation. It is thought that this construction will be readily grasped from a study of FIG. 1, where three successive steps are shown as an example, the lens surface at the top of each wave or undulation being indicated at 1, and the surface at the bottom of each valley being indicated at 2, the two profiles merging in a smooth circumferential line 4 at the outer edge of each step and resulting in the wavy or undulating edge 5 at the radially inner edge of each step.

Figure 2:
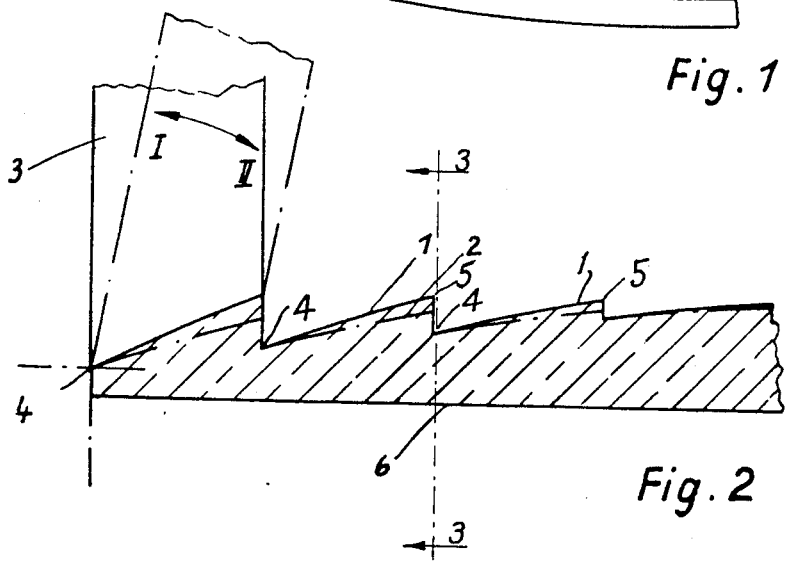
FIG. 2 is a schematic radial section through a fragment of the lens shown in FIG. 1.
Figure 3:
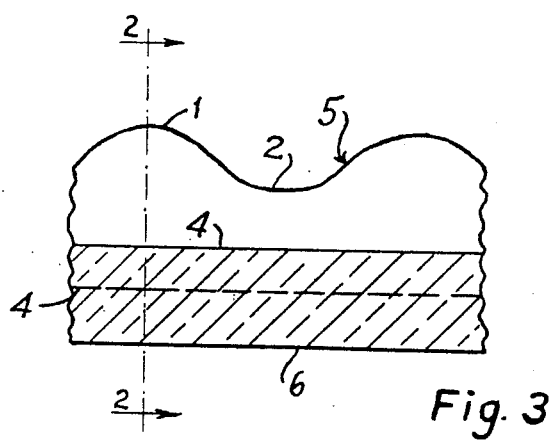
FIG. 3 is a fragmentary circumferential section approximately on the line 3—3 of FIG. 2.

Referring now to FIG. 2, which is a fragmentary radial section through the lens with the section being taken through the high point of the wave of each step, the profile of the surface at the high point is again indicated by the numeral 1, while the broken line 2 shows the profile at the low point of the wave, a slight distance circumferentially from the radial plane on which the section is taken. As already mentioned when discussing FIG. 1, the profiles merge with each other at one edge 4 which is smooth or straight in a circumferential direction, and have their maximum waviness or difference at the other edge 5. For a better understanding, see also FIG. 3, which is a fragmentary circumferential section looking radially outwardly toward the outer edge of the lens, and clearly showing the smooth edge 4 at the point where the section plane is taken, as well as showing, in a broken line, the smooth edge 4 of the next adjacent step radially outwardly from the step where the section plane is taken. The wavy edge 5 of the next outward step is also shown in elevation, the high and low points thereof being indicated respectively by 1 and 2.

The circumferential distance from one high point 1 to the next high point 1 of the same step is subject to wide variation and is not particularly critical. Conveniently, it is of about the same order of magnitude as the order of magnitude of the width of each step in a radial direction. As above mentioned, each step may conveniently have a width of about 50 microns in a radial direction, and the undulations may also have a dimension of about 50 microns in a circumferential direction, from high point to the next high point, or from a low point to the next low point.

The profile of each step may be either spherical or aspherical. In the first embodiment of the invention, illustrated in FIGS. 2 and 3, it is spherical. The preferred method of producing the lens is to provide a cutting tool or cutting stylus indicated schematically at 3 in FIG. 2, the cutting edge of which has the shape of a segment of a circle of the desired radius. The lens blank, made of suitable plastic material capable of being cut and shaped by the cutting tool 3, is mounted on a suitable turntable and is rotated about the center of the lens, and the cutting tool 3 is brought into contact with the surface of the lens which is to be formed into the Fresnel steps. While rotation of the lens blank continues, the tool 3 being held firmly against the blank, it is seen that a conventional Fresnel step would be formed if the cutting tool were maintained stationary. However, to make the present lens, the cutting tool is not maintained stationary, but on the contrary is tilted back and forth between position I and position II, the corner of the cutting tool 3 at the point 4 being the center or axis of the tilting motion. When the cutting tool 3 reaches the position I (the left hand or most counterclockwise position shown in FIG. 2) the cutting edge of the tool will be forming a high point or surface 1 on the Fresnel step which is then being formed. When the cutting tool tilts clockwise (viewed as in FIG. 2) to the position II, the cutting edge will be forming the Fresnel profile 2 at the low point of the wave. Consequently, by tilting the tool 3 constantly back and forth while the rotary motion of the lens blank continues, the Fresnel step of the lens blank will be cut to the desired wavy or undulating form. The back and forth tilting of the cutting tool is, of course, relatively rapid as compared to the much slower rotation of the lens blank.

If it is desired to form the Fresnel steps strictly concentric with respect to each other, the cutting tool 3 is tilted back and forth without any change in its radial position with respect to the center of rotation of the lens blank, until one step is formed; then it is readjusted radially inwardly or outwardly to the proper position for the next Fresnel step, and the blank is rotated to form the next step; and so on. However, it is simpler, easier, and quicker in most cases to give a slight radial feeding motion to the tool (that is, radial with respect to the center of rotation of the lens blank) while the rotation of the lens blank continues and while the back and forth tilting motion of the cutting tool continues. This results in forming the Fresnel steps in spiral fashion rather than strictly concentric with each other. However, the spiral effect is so slight with respect to the circumferential length of each step throughout at least the major part of the area of the lens, that for practical purposes the steps may be regarded as concentric circles, and such spiral steps are to be regarded as falling within the term "concentric" as broadly used in this description and the claims with reference to the Fresnel steps.

When the lens is formed in this manner, it is seen that the lens will have one focal length in a radial plane through the high points as shown in full lines at 1 in FIG. 2, and will have a somewhat longer focal length when considered in a radial plane through the low points of the waves, as indicated in broken lines 2 in FIG. 2. At intermediate points of each wave, the focal length will vary between the minimum and maximum limits established by the high and low points of the wavy profile. Thus the lens has a variety of focal lengths in different radial planes spaced slightly from each other in a circumferential direction. If the flat surface 6 of the lens (that is, the surface opposite to the stepped Fresnel surface) is formed into a focusing screen, or is placed against a separate focusing screen, excellent results are obtained with regard to the brightness or brilliance of the image on the focusing screen, even at or relatively close to the corners of the screen, and notwithtsanding differences in the distance of the eye of the observer from the focusing screen, or changes in the focal length of the lens used to project the finder image onto the focusing screen. There is a noticeable improvement in the appearance of the focusing image, as compared with the prior art.

A second embodiment of the invention will now be described with reference to FIGS. 4–7 of the drawings. This second embodiment is the same in general as the first embodiment, and has the same wavy or undulating form in a circumferential direction with respect to each step of the Fresnel surface, but the exact profile of each step is somewhat different and the shape of the cutting tool is different. The profile, in this second embodiment, is aspherical rather than spherical.

Figure 4:
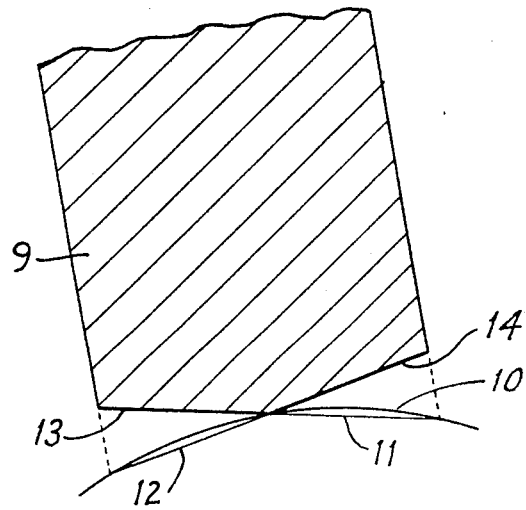
FIG. 4 is a schematic view on a larger scale, illustrating details of the cutting stylus or forming cutter for forming the lens according to a second embodiment of the invention, and showing how the shape thereof is derived.

Referring first to FIG. 4, to illustrate the principle of the profile, the theoretical spherical profile of any one step is indicated by the line 10, a segment of a circle. However, since this segment is very short (in other words, the radial width of the step is small, of the order of magnitude of 50 microns) two chords 11 and 12 may be substituted for the theoretical circle 10, without doing any great violence to the optical principles and without doing any serious damage to the optical results achieved, bearing in mind that in any event we are only dealing with the observation of a finder image and are not dealing with a projection lens or photographic lens where extremely high quality is needed.

If the width of each Fresnel step is to be divided into two zones which are chords of a circle rather than a single zone which is a segment of a circle, it will further be seen that it does not matter, optically, whether the two zones are in the relative positions shown at 11 and 12 in FIG. 4, or whether the positions are reversed. In other words, the profile of the Fresnel step may be formed by the chord 11 as the profile of the outer zone of the step and chord 12 as the profile of the inner zone of the step, rather than vice versa. This reversal permits the formation of the cutting edge of the cutting tool 9 with the straight lines 13 and 14, respectively, at the proper angles for the chords 11 and 12, respectively, with the result that the cutting tool can be formed more easily and accurately because the cutting edges are formed by straight lines which intersect at an outward projection, rather than being formed as a concave curve (as in the cutting tool 3 in FIG. 2) or being formed, even with straight lines, as a reentrant cavity. The cutting tool 3 as well as the cutting tool 9 are preferably diamonds.

Figure 5:
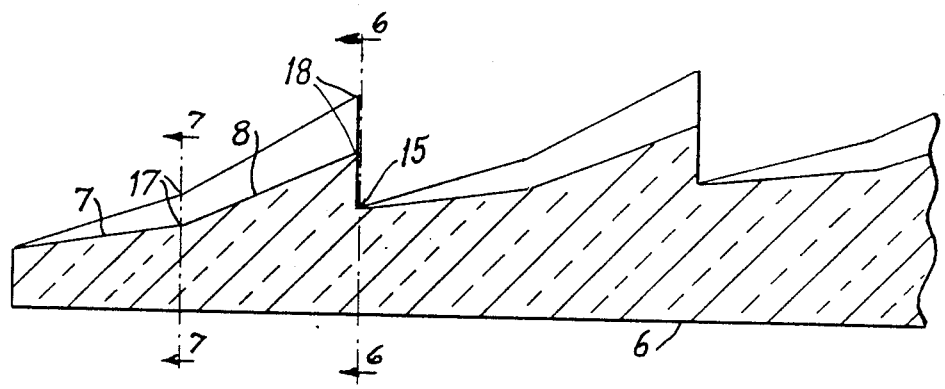
FIG. 5 is a view similar to FIG. 2, showing the second embodiment of the invention.
Figure 6:
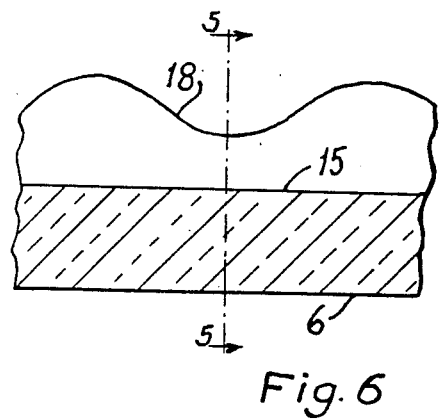
FIG. 6 is a fragmentary section taken approximately on the line 6—6 of FIG. 5.
Figure 7:
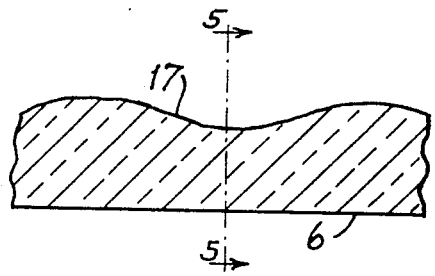
FIG. 7 is a fragmentary section taken approximately on the line 7—7 of FIG. 5.

In this second embodiment of the invention, the cutting tool 9, formed to the shape explained with reference to FIG. 4, is used in the same way as the cutting tool 3 mentioned in connection with FIG. 2. As the lens blank of plastic material is rotated about an axis passing through the optical center of the lens, the cutting tool is brought into contact with the plastic material, and will form the steps in the profile indicated in FIG. 5. Each step will be formed in two zones side by side each other in a radial direction, and each running circumferentially around the Fresnel step. The portion of the profile shown at 7 in FIG. 5 will be formed by the cutting edge 13 (FIG. 4) of the cutting tool 9, and the portion of the profile shown at 8 in FIG. 5 will be the portion formed by the edge 14 of the cutting tool 9. The cutting tool tilts back and forth while the rotation of the lens blank continues, just as in the case of the earlier embodiment, and thus the undulating or wavy shape is produced, just as in the earlier embodiment, the difference being that the profile of each step, in a radial direction, is aspherical and consists of two straight chords rather than being spherical and consisting of a segment of a circle. The shape of the surfaces as seen in circumferential section taken on the lines 6—6 and 7—7 of FIG. 5 are as shown in FIGS. 6 and 7, respectively, where the line 17 indicates the shape (in a circumferential direction) of the junction or intersection between the chords 7 and 8, and the line 18 indicates the visible wavy upper edge of the chord 8.

This second embodiment not only has the above mentioned advantage that the diamond cutting tool can be formed more easily than a tool which is formed with a concave edge, but also the further advantage that with this particular profile, it is found that a more critical focusing of the image is possible, particularly in the vicinity of the center of the lens.

What is claimed is:
1. A field lens of the Fresnel type for use as a field lens in a finder of a reflex camera, said lens having on one surface a series of Fresnel steps each of which continuously undulates in a circumferential direction to vary the focal length of the step at different points spaced circumferentially from each other, one edge of each circumferential step being substantially smooth without undulations and the opposite edge of the same step being of wavy shape with successive high points alternating with successive valleys between the high points.

2. A lens as defined in claim 1, in which the radial profile of each step, from the smooth edge to the wavy edge thereof, is a segment of a circle.

3. A lens as defined in claim 1, in which the radial profile of each step, from the smooth edge to the wavy edge thereof, is formed by a plurality of straight chords of a circle intersecting each other at a point intermediate the width of the step.

4. A lens as defined in claim 3, in which said profile is formed by two chords intersecting substantially at the middle of the width of the step.

References Cited

UNITED STATES PATENTS

| | | |
|---|---|---|
| 1,955,599 | 4/1934 | Lamblin-Parent. |
| 3,004,470 | 10/1961 | Rühle _____ 350—211 X |
| 3,020,395 | 2/1962 | Peltz _____ 350—211 X |

DAVID SCHONBERG, Primary Examiner

P. A. SACHER, Assistant Examiner

U.S. Cl. X.R.

350—167, 175

UNITED STATES PATENT OFFICE
CERTIFICATE OF CORRECTION

Patent No. 3,523,720                                        August 11, 1970

Karl Schiele

It is certified that error appears in the above identified patent and that said Letters Patent are hereby corrected as shown below:

In the heading to the printed specification, after line 6, insert -- Claims priority, application Germany, July 12, 1967 P 12 67 966.2 --.

Signed and sealed this 23rd day of February 1971.

(SEAL)
Attest:

Edward M. Fletcher, Jr.                                  WILLIAM E. SCHUYLER, JR.
Attesting Officer                                                  Commissioner of Patents